(12) United States Patent
Pandharipande et al.

(10) Patent No.: US 9,301,374 B2
(45) Date of Patent: Mar. 29, 2016

(54) CONTROL OF LIGHTING DEVICES

(71) Applicant: KONINKLIJKE PHILIPS N.V., Eindhoven (NL)

(72) Inventors: Ashish Vijay Pandharipande, Eindhoven (NL); David Ricardo Caicedo Fernández, Eindhoven (NL)

(73) Assignee: KONINKLIJKE PHILIPS N.V., Einhoven (NL)

( * ) Notice: Subject to any disclaimer, the term of this patent is extended or adjusted under 35 U.S.C. 154(b) by 0 days.

(21) Appl. No.: 14/394,879

(22) PCT Filed: May 10, 2013

(86) PCT No.: PCT/IB2013/053802
§ 371 (c)(1),
(2) Date: Oct. 16, 2014

(87) PCT Pub. No.: WO2013/171645
PCT Pub. Date: Nov. 21, 2013

(65) Prior Publication Data
US 2015/0123561 A1    May 7, 2015

Related U.S. Application Data

(60) Provisional application No. 61/647,005, filed on May 15, 2012.

(51) Int. Cl.
*H05B 37/02*    (2006.01)
*G01S 15/04*    (2006.01)

(52) U.S. Cl.
CPC ............ *H05B 37/0272* (2013.01); *G01S 15/04* (2013.01); *H05B 37/0227* (2013.01)

(58) Field of Classification Search
CPC   H05B 37/0227; H05B 37/0272; G01S 15/04; G08C 15/06; G08C 23/02; G08B 5/36; H04W 84/18
See application file for complete search history.

(56) References Cited

U.S. PATENT DOCUMENTS 5,504,477 A    4/1996    Whitright et al.
5,905,442 A    5/1999    Mosebrook et al.
(Continued)

FOREIGN PATENT DOCUMENTS

WO    9625021 A1    8/1996
WO    2005069698 A1    7/2005
(Continued)

OTHER PUBLICATIONS

Xiao Wendong et al., "A Prototype Ultrasonic Sensor Network for Tracking of Moving Targets", 2006 1st IEEE Conference on Industrial Electronics and Applications, Singapore, May 1, 2006, IEEE, Piscataway, NJ, pp. 1-6.*
(Continued)

*Primary Examiner* — Vibol Tan
(74) *Attorney, Agent, or Firm* — Meenakshy Chakravorty (57) ABSTRACT

Presence adaptive lighting control strategies are known to be very effective in reducing energy consumption in buildings. Ultrasonic array sensors have been proposed for reliable presence sensing. Systems and methods are disclosed by which additional sensing functionalities may be enabled for providing new control functions, with the array sensor as basic sensing platform. In particular, hybrid sensing that combines portable sensors (possibly, user enabled) and fixed-infrastructure sensors is considered. Applications are, for example, active presence sensors in lighting control applications.

14 Claims, 5 Drawing Sheets

(56) References Cited

U.S. PATENT DOCUMENTS

| | | | |
|---|---|---|---|
| 7,943,908 B2* | 5/2011 | Smolyaninov | G01N 21/6458 250/458.1 |
| 9,161,417 B2* | 10/2015 | Pandharipande | H05B 37/0227 |
| 2002/0175815 A1* | 11/2002 | Baldwin | 340/567 |
| 2007/0146126 A1* | 6/2007 | Wang | 340/517 |
| 2008/0185969 A1* | 8/2008 | Vegter et al. | 315/158 |
| 2010/0225245 A1 | 9/2010 | Schenk et al. | |
| 2011/0285515 A1 | 11/2011 | Fushimi et al. | |
| 2014/0176944 A1* | 6/2014 | Addison | G01B 11/14 356/400 |
| 2015/0048954 A1* | 2/2015 | Caicedo Fernandez | G08C 15/06 340/815.45 |
| 2015/0206415 A1* | 7/2015 | Wegelin | G08B 21/245 340/573.4 |

FOREIGN PATENT DOCUMENTS

| | | |
|---|---|---|
| WO | 2011151772 A1 | 12/2011 |
| WO | 2011151796 A1 | 12/2011 |

OTHER PUBLICATIONS

Xiao Wendong et al; "A Prototype Ultrasonic Sensor Network for Tracking of Moving Targets", 2006 1st IEEE Conf. on Industrial Electronics and Application, Singapore, May 1, 2006, Piscataway, NJ, IEEE Service Center, pp. 1-6, XP031026716.

* cited by examiner

CONTROL OF LIGHTING DEVICES

CROSS-REFERENCE TO PRIOR APPLICATIONS

This application is the U.S. National Phase application under 35 U.S.C. §371 of International Application No. PCT/IB13/053802, filed on May 10, 2013, which claims the benefit of U.S. Provisional Patent Application No. 61/647,005, filed on May 15, 2012. These applications are hereby incorporated by reference herein.

FIELD OF THE INVENTION

The present invention generally relates to the field of control systems, and in particular to a control system comprising a first active sensor and a second active sensor and methods corresponding thereto.

BACKGROUND OF THE INVENTION

Office lighting constitutes almost 30% of the electrical consumption in buildings. As the cost and energy efficiency of light-emitting-diode (LED) light sources improve, they are becoming viable alternatives for fluorescent lamps, further offering the advantage of color control. It is recognized that lighting control strategies based on occupant presence information are very effective in reducing energy consumption. For example, in unoccupied areas the illumination may be dimmed or extinguished. Hence the design of green buildings may benefit from presence-adaptive lighting control systems.

It is known that active sensors, such as ultrasound based sensors, provide better detection than passive infrared sensors in large volumetric spaces. It is further known that active sensors are more sensitive than passive infrared sensors generally. An ultrasonic array sensor has been described in WO 2005/069698 for reliable presence sensing that, when interfaced with a lighting control system, provides reliable illumination rendering.

In accordance with WO 2005/069698, a light source illuminates a local area with light that is modulated to identify the local area. In response to detection of the modulated light, a wearable occupancy detector located in the local area radiates a signal identifying the local area. The radiated signal is received by a control unit that is in communication with the light source and is capable of controlling a lighting function of the light source. Occupancy detection in accordance with WO 2005/069698 does not depend on motion.

SUMMARY OF THE INVENTION

To achieve advanced control functions like localized illumination rendering, wherein illumination effects are localized around occupants of a local area, information regarding occupant locations is preferably desired. However, the inventors of the enclosed embodiments have identified a number of disadvantages with the above noted concepts. Particularly, it has been found that fully automatic illumination rendering effects from lighting systems may not always be desirable due to personal preferences of occupants. For example, users (i.e. occupants) may tend to prefer enabling or disabling illumination effects based on the activity they are engaged in, or for other reasons.

It is an object of the present invention to overcome these problems, and to provide a control system comprising a number of active sensors that are arranged such that the sensing infrastructure may be capable of offering scalability in functionality. It is an object of the present invention to provide a control system that comprises portable sensors that in combination with an infrastructure-fixed array sensor can enable an increased, richer, sensing function. According to a first aspect of the invention, the above and other objectives are achieved by a control system, comprising a first active sensor comprising a transmitter arranged to transmit a first probe signal; and a second active sensor comprising a transmitter arranged to transmit a second probe signal, and a receiver sensor array arranged to receive the first probe signal and an echo of the second probe signal; wherein the first probe signal is possibly different from the second probe signal such that interference at the receiving sensor array between the first probe signal and the second probe signal is avoided.

The disclosed system may thus advantageously be used in situations wherein users employ devices comprising the first active sensor to assist a fixed infrastructure comprising the second active sensor to determine locations of the user.

Preferably the disclosed first active sensor needs only to be capable of transmitting a signal (and hence not to receive any signals). The disclosed first active sensor does not even need to be synchronized with the fixed infrastructure. Since the signal of the local device is distinct from the fixed infrastructure as represented by the second active sensor.

According to an embodiment the control system further comprises a light source and a processing unit, wherein the processing unit is arranged to predictively estimate a location of the first active sensor based on the received first probe signal, and to control a lighting function of the light source in accordance with the predictively estimated location of the first active sensor. Advantageously the control system thereby enables improved lighting control functionalities.

Based on phase difference measured between multiple elements of the receiver sensor array, the first active sensor can be localized by using a direction of arrival algorithm. The first probe signal originating from the first active sensor may be detected by correlation. Preferably, the signal transmitted by the local device is an in band signal. This requires no adaptation of the receiver sensor array. Alternatively the signal can be sent out of band. This may allow for a cheaper transmitter of the first active sensor. Although an out of band transmission could require a wideband receiver sensor array in the second sensor, one advantage of out of band signaling is avoiding interference with the signal sent from the second active sensor.

According to an embodiment, the first active sensor further comprises a receiver. The first probe signal is then preferably transmitted in response to reception of the second probe signal by the receiver. Thereby the control system may be synchronized. Advantageously, a receiver element in the first sensor, provides a better accuracy in the localization. If the first sensor does not have a receiver element, an estimation of the location of the occupant can only be obtained based on angular information.

According to an embodiment, the first active sensor comprises an array of receiver elements. Thereby improved localization of the first active sensor may be achieved. The synchronization is preferably performed with respect to the signal coming from a predefined angle, i.e. corresponding to the second sensor.

According to a second aspect of the invention, the objective is achieved by a method in a control system comprising a first active sensor and a second active sensor, comprising transmitting, by a transmitter of the first active sensor, a first probe signal; transmitting, by a transmitter of the second active sensor, a second probe signal; and receiving, by a receiver sensor array of the second active sensor, the first probe signal and an echo of the second probe signal; wherein the first probe signal is different from the second probe signal such that interference at the receiving sensor array between the first probe signal and the second probe signal is avoided.

It is noted that the invention relates to all possible combinations of features recited in the claims. Likewise, the advantages of the first aspect apply to the second aspect, and vice versa.

BRIEF DESCRIPTION OF THE DRAWINGS

The above and other aspects of the present invention will now be described in more detail, with reference to the appended drawings showing embodiment(s) of the invention.

DETAILED DESCRIPTION

The below embodiments are provided by way of example so that this disclosure will be thorough and complete, and will fully convey the scope of the invention to those skilled in the art. Like numbers refer to like elements throughout. The devices disclosed in the below embodiments will be described in an operation context of the system.

Embodiments of the present invention may be applied to improvements of localized lighting rendering in a location with a fixed sensor infrastructure. To this extent portable sensor devices (one of which below is referred to as a first active sensor) are provided that offer improved local presence detection and add-on to the existing infrastructure.

International patent application WO2005/069698 describes a wearable occupancy detector that is based on the use of a uniquely-modulated signal (e.g., radio frequent (RF), infrared (IR) or visible light), which is used to indicate presence in certain local areas so that the certain local areas can be appropriately illuminated. This probably requires not only the use of the wearable occupancy detector but also a receiving unit at the lighting controller that is able to distinguish between potentially multiple occupancy detectors, and also identify them. Particularly, in accordance with WO2005/069698, a light source illuminates a local area with light that is modulated to identify the local area. In response to detection of the modulated light, a wearable occupancy detector located in the local area radiates a signal identifying the local area. Thus the wearable detectors are reactive, i.e. they transmit only after receiving a signal from the light sources.

In contrast to WO2005/069698, embodiments of the present invention are based on a system already comprising an infrastructure ultrasonic array sensor that performs presence detection. According to the present invention there is disclosed a portable sensor system that can coexist with the infrastructure sensor, thereby realizing new control functionalities. The portable sensor system is independent from the infrastructure sensor in the sense that it is not activated or otherwise controlled by the infrastructure sensor, as is the case in WO2005/069698.

Embodiments of the present invention will be disclosed with respect to an ultrasonic sensor modality, although the embodiments may likewise be applied to other active sensors, such as radars. It is further assumed that an ultrasound array sensor (referred below to as a second active sensor) is fixed in the lighting infrastructure of a room. However, as the skilled person understands, the ultrasound array sensor may be separated from the lighting infrastructure.

Figure 1:
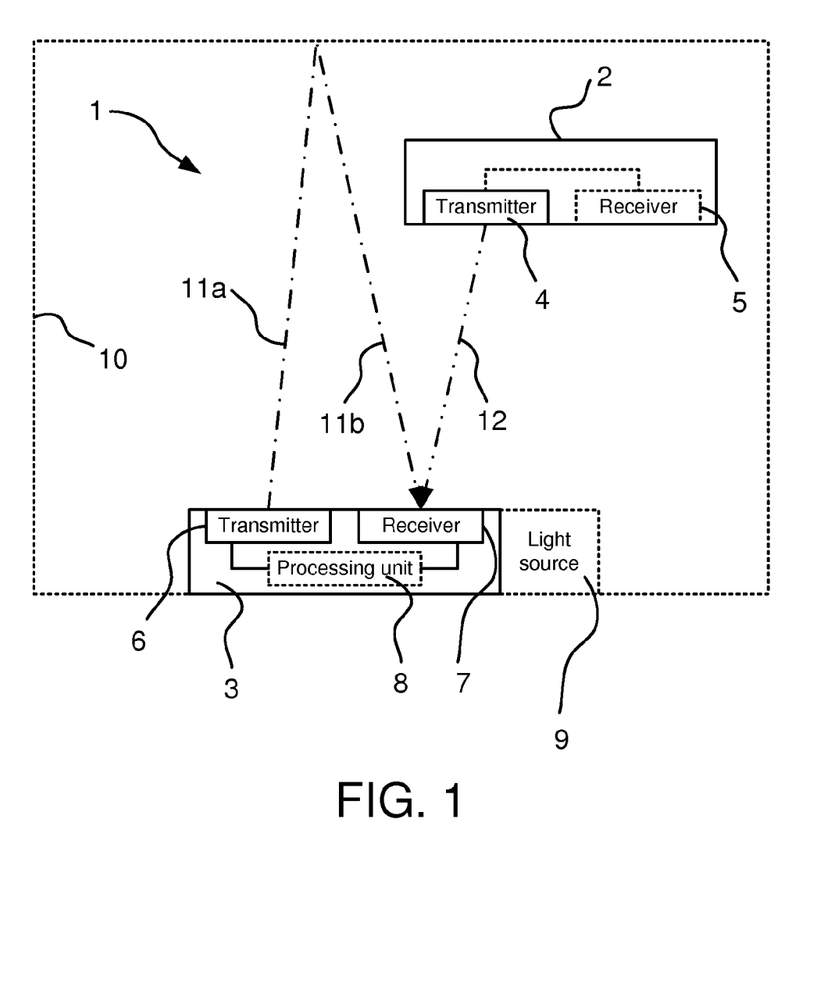
FIG. 1 illustrates a control system according to embodiments.

FIG. 1 schematically illustrates a control system 1 according to the present invention. The control system 1 is according to the schematic example of FIG. 1 placed in a room 10. Typically the room 10 is a room of a building. The control system 1 comprises a first active sensor 2 and a second active sensor 3. The first active sensor 2 is preferably a portable sensor. The second active sensor 3 is preferably a fixed infrastructure sensor. The first active sensor 2 comprises a transmitter 4 and optionally a receiver 5. The second active sensor 3 comprises a transmitter 6, a receiver 7 and optionally a processing unit 8. The control system 1 may further comprise at least one light source 9. According to embodiments the second active sensor 3 and at least one of the at least one light sources 9 are part of the same device, for example a luminaire. Thus the light source 9 may be said to comprise the second active sensor 3.

Figure 2:
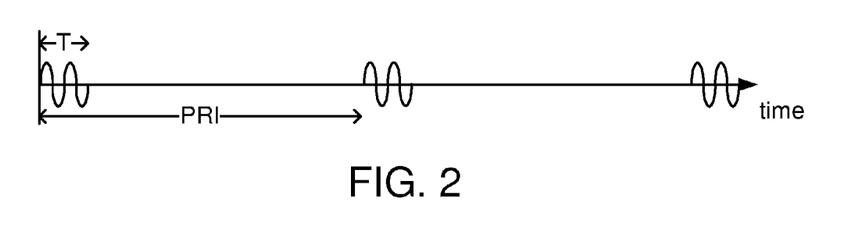
FIGS. 2-7 schematically illustrate waveforms of probe signals according to embodiments.

The transmitter 6 of the second active sensor 3 is, in a step S04, arranged to transmit a second probe signal 11a as represented by the waveform illustrated in FIG. 2 over an area defined by the directivity of the transmitter 6. The parameter T defines a length over which the waveform is non-zero in each pulse repetition interval (PRI) and is chosen as per the spatial resolution required. The PRI is chosen to accommodate the largest expected range in time before an echo 11b of the transmitted second probe signal 11a is expected to be received by the receiver 7.

The receiver 7 of the second active sensor 3 is preferably a receiver sensor array and thus preferably comprises one or more receiver elements in an array. At the receiver 7, received signals are processed in order to determine presence sensing information. Assume first that an echo 11b of the second probe signal 11a is received by the receiver 7, step S06. As will be further disclosed below with reference to FIGS. 5 and 6, firstly a difference signal is obtained by taking the difference of echo signals corresponding to two PRIs. A static object results in a corresponding (almost) zero difference signal component at the related time-of-flight, whereas a moving object results in a non-zero signal component at the related time-of-flight. The power in the difference signal at different time-of-flight windows can thus be used to, by means of the second probe signal 11a and its echo 11b, detect human presence in the room 10.

Assume now that the first active sensor 2 is added to the room 10. The transmitter 4 of the first active sensor 2 is arranged to transmit a first probe signal 12, step S02. Preferably the first active sensor 2 is carried by a user. When the user of the first active sensor 2 desires localized illumination, the transmitter 4 of the first active sensor 2 is activated, for example by means of receiving user input from the user, to transmit the first probe signal 12. The first probe signal 12 is received by the receiver 7 of the second active sensor 3, step S06. The waveform of the first probe signal 12 is preferably different from the waveform of the second probe signal 11a such that interference at the receiving sensor array between the first probe signal 11 and the second probe signal 12a is avoided, or at least minimized. This will be further disclosed below with references to FIGS. 5-7.

Figure 3:
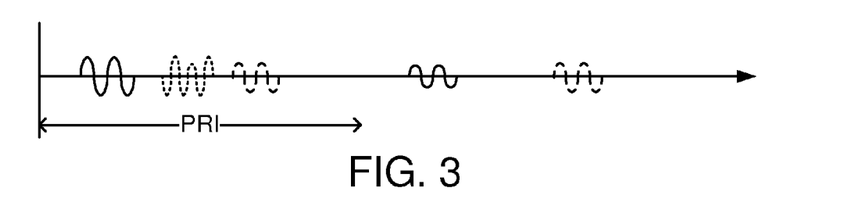

FIG. 3 schematically illustrates received (echoes of) probe signals at a particular receiver element of the receiver 7. The received signals correspond to echoes 11b of two transmitted second probe signals 11a transmitted by the second active sensor 3 and one transmission of a first probe signal 12 transmitted by the first active sensor 2. In particular, the solid and dashed waveforms in FIG. 3 correspond to echoes from a moving and a static source, respectively, and the dotted waveform corresponds to the received first probe signal transmitted by the transmitter 4 of the first active sensor 2. Thus, the signal received at the second active sensor 3 and which originates from the first active sensor 2 is not an echo from the first active sensor 2 but a direct transmission from the first active sensor 2 to the second active sensor 3. Hence, the waveform of the first probe signal 12 from the first active sensor 3 is preferably chosen to be uncorrelated to the waveform of the second probe signal 11a (and the echo 11b thereof) transmitted by the second active sensor 3.

Figure 5:
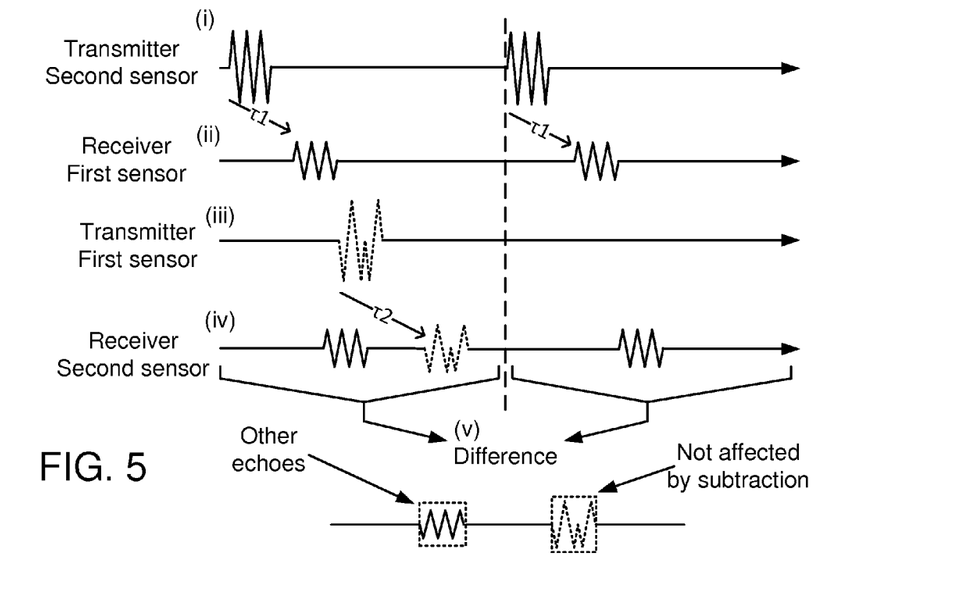

The first probe signal 12 preferably comprises only a single waveform burst. The first probe signal 12 advantageously comprises only a single waveform burst in order to avoid the elimination of the first probe signal 12 during signal processing at the receiver 7, for example when determining a difference between pulses in two consecutive PRIs. This process is illustrated in FIG. 5. At (i) in FIG. 5 a second probe signal (solid lines) is in the first and second PRIs transmitted by the transmitter 6 of the second active sensor 3. At (ii) echoes of the second probe signal are in the first and second PRIs received by the receiver 7 of the second active sensor 3 at time ●1 after transmission of the same. At (iii) a first probe signal (dotted lines) is transmitted by the first active sensor 2. At (iv) also the first probe signal is received by the second active sensor 3 at time ●2 after transmission of the same. The first probe signal 12 is received at the receiver 7 at an arbitrary time delay from its transmission by the transmitter 4. Thus, the time delay ●2 is, in the most general case, unknown at the receiver 7 because the first active sensor 2 and the second active sensor 3 are not necessarily synchronized. At (v) the difference between the collected signals received in the first and the second PRIs is taken and since there is only one version of the first probe signal (where the first probe signal is preferably different from the second probe signal), the first probe signal is not affected by the subtraction (or at least it is not fully eliminated). Subtraction preferably involves time shift and/or scaling of the signal in the two PRIs.

In general, in practical circumstances (e.g. in noisy environments), the control system 1 would be sufficiently robust if the first active sensor 2 transmits the first probe signal 12 more than once. The first probe signal 12 can be transmitted every n:th PRI, where n>2. The first probe signal 12 is preferably not transmitted in every second PRI, because the first probe signal 12 would then be eliminated when the difference is obtained at the receiver 7. Thus, the (transmitter 4 of the) first active sensor 2 may be arranged to transmit at most one first probe signal 12 for every three transmissions of the second probe signal 11a. Preferably the first probe signal 12 is an in-band transmitted signal with respect to the receiver 7 of the second active sensor 3. An in-band transmitted waveform refers to a waveform with centre frequency within the bandwidth of the receiver 7.

In an alternate embodiment, the first probe signal 12 is an out-of-band signal with respect to the receiver 7 of the second active sensor 3. Such an out-of-band signal may inter alia be transmitted at acoustic frequencies or other ultrasonic frequencies within the bandwidth of the receiver 7. It is possible to use such an out-of-band signal given the wideband frequency response of the receiver elements of the second active sensor 3. If the received power exceeds a pre-defined threshold upon correlation at the designated frequencies of transmission, then the direction-of-arrival (see below) is determined based on which localization is achieved.

Figure 6:
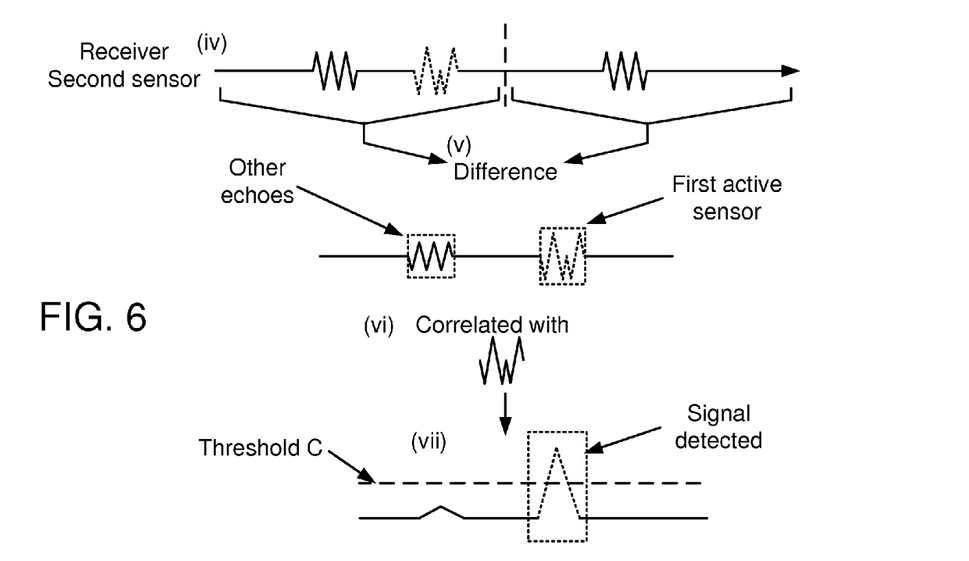
Figure 7:
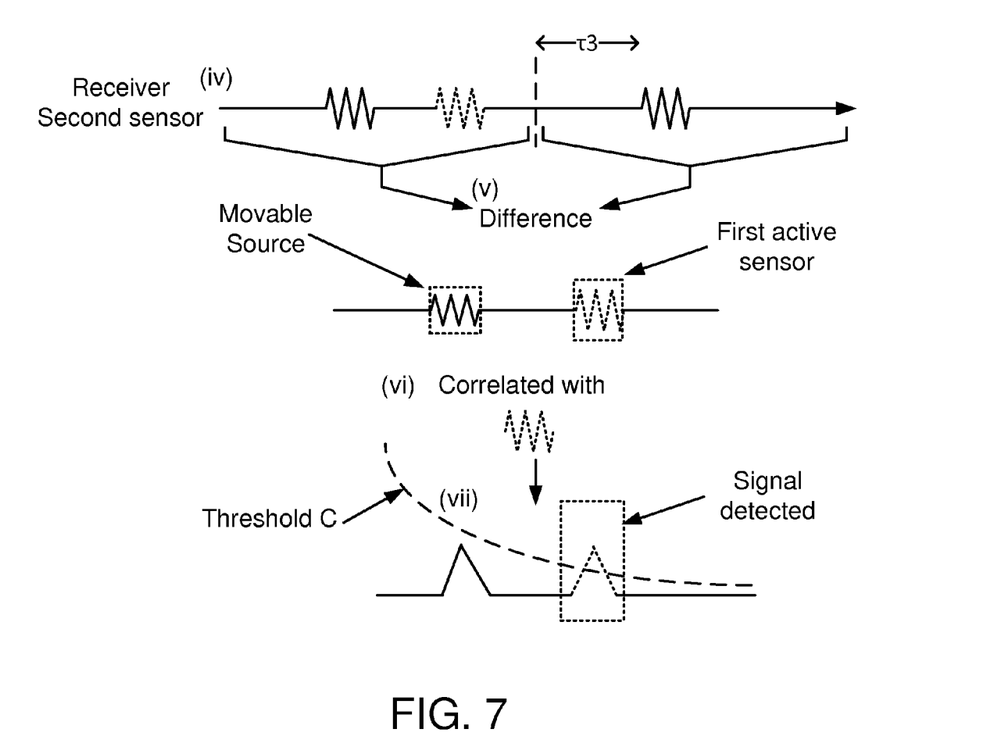
Figure 8:
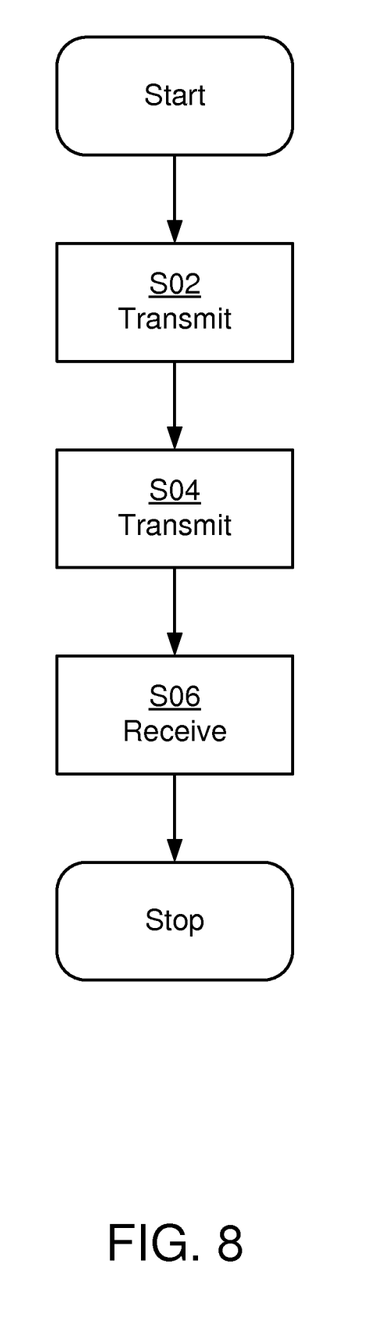
FIG. 8 is a flowchart of a method according to embodiments.

As noted above, the control system 1 may further comprise a processing unit 8 which preferably is part of the second active sensor 3. The processing unit 8 is preferably arranged to predictively estimate a location of the first active sensor 2 based on the received first probe signal 12. As is illustrated in FIG. 6, at the second active sensor 3, the following processing may be performed. At (vi) a version of the first probe signal 12 may be accessible by the second active sensor 3. For example, a local copy of the waveform transmitted by the first active sensor 2 is maintained and correlated with the received signal. If the first active sensor 2 is to be uniquely determined, then a pre-configuration step may be required where a specific waveform is associated with the first active sensor 2 and a local copy thereof is stored at the second active sensor 3. The local copy preferably is an exact copy of the first probe signal 12. If unique identification of the first active sensor 2 is not required, then a general predefined waveform (preferably still different from the waveform of the second probe signal 11a as transmitted by the second active sensor 3, but not unique with respect to different first active sensors) can be used which has been previously store in (or being accessible by) the second active sensor 3 (inter alia via programming or commissioning). If the differential signal at the second active sensor 3 is correlated with the local copy of the waveform from the first active sensor 2, then at (vii) a high correlation would be observed at the instant when the direct first probe signal is received by the second active sensor 3. If the correlation is higher than a threshold 'C' then it may be determined that a signal equal to the local waveform was received at that instant of time. If a peak is observed due to correlation (in FIG. 6 illustrated by 'signal detected'), then the phase differences of the signals at different receiver elements of the receiver 7 may be used to determine the direction-of-arrival (DoA) based on which the first active sensor 2 (equivalently, the user of the first active sensor 2) is localized. A standard DoA algorithm may be used for DoA estimation. In an optional further processing, the DoA may be compared with a DoA that is determined (inter alia based on reflections due to the user of the) first active sensor 2 using the received signals at the second active sensor 3 based on which even the range of the user with respect to the second active sensor 3 may be determined. Signal components excepting the correlated signal component may be used to determine presence and enhanced presence information as described in WO2005/069698. The processing unit 8 may then, based on the estimated location of the first active sensor 2, control a lighting function of the light source 9. The lighting function preferably relates to illumination of the location determined for the first active sensor 2.

Thus far it has been assumed that the waveform of the first probe signal 12 is different from the waveform of the second probe signal 11a and the echo 11b thereof as received by the receiver 7 of the second active sensor 3. However, it may be possible to identify the first probe signal 12 also in the case when the waveforms of the first probe signal 12 and the second probe signal 11a are identical. Particularly, FIG. 7. illustrates a situation where the waveform of the first probe signal 12 is identical to the waveform of the second probe signal 11a but where the arrival time at the receiver 7 differs. In the second PRI only one signal is received. The time delay for said one signal in the second PRI is ●3. Since only one signal is received in the second PRI it may be assumed that no direct transmission is received in the second PRI. The time delay ●3 may then be used to set the threshold C. In this case the threshold C will have a slope. The slope generally depends on ●3. The threshold C is thus in fact not a fixed constant but a threshold function. The threshold function C is determined, based on ●3, such that a signal in the first PRI corresponding to the signal received in the second PRI at time delay ●3 is not identified as a direct transmission. As noted in FIG. 7 the two peaks have the same height but by means of the threshold function C only one peak is identified as being representative of a direct transmission from the first active senor 2. Thereby the direct transmission of the first probe signal 12 can be identified even though both waveform and amplitude are the same as for the second probe signal 11a.

Alternatively, if the transmitted power of the second probe signal 11a is known, then the maximum received power of any echo at a given range can be determined. The first probe signal 12 of the first active sensor 2 is only attenuated by distance and the power is the same after the differential processing. It could further be assumed that for a given range, any signal with a power higher than a threshold originates from the first active sensor. This procedure may have a higher rate of misdetection and may require several retransmission from the first active sensor 3 to ensure the detection of the first probe signal 12. Furthermore, it may require a larger transmission power of the transmitter 4 of the first active sensor 3.

Figure 4:
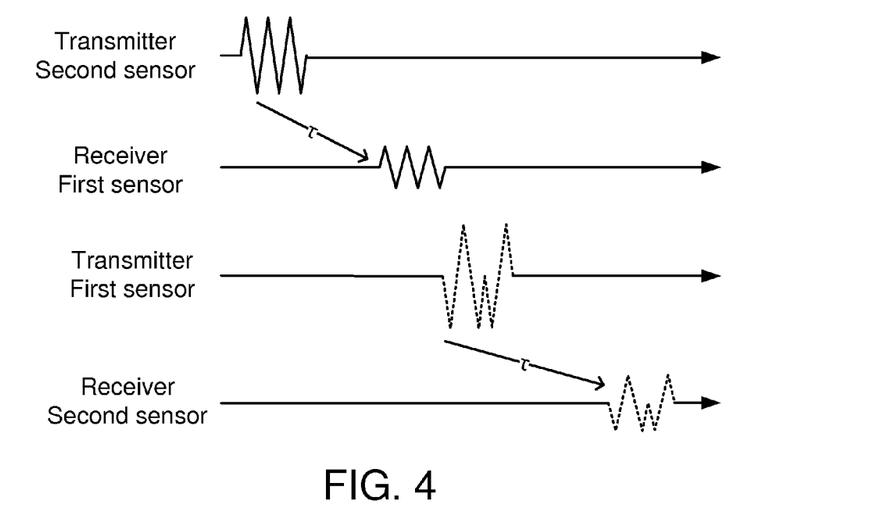

According to embodiments, the first active sensor 2 also comprises a receiver 5. The first probe signal 12 is then preferably transmitted (in-band or out-of-band) just after the receiver 5 detects the second probe signal 12a transmitted by the second active sensor 3. In other words, the transmitter 4 of the first active sensor 2 may be arranged to transmit the firs probe signal 11 in response to reception of the second probe signal 12a by the receiver 5. Assume that the time duration (time-of-flight) for a one-way transmission of a (first and/or second) probe signal between the first active sensor 2 and the second active sensor 3 is ●. The first probe signal 12 is then received at the receiver 7 at a time delay, ~2●, that is related to the distance between the first active sensor 2 and the second active sensor 3, as depicted in FIG. 4. The location of the portable sensor may then be obtained using the DoA as determined above and the time-of-flight of the signal.

According to embodiments, the receiver 5 of the first active sensor 2 is an array sensor which comprises an array of receiver elements. Thereby, when a user of the first active sensor 2 desires a localized illumination effect, the first active sensor 2 may be arranged to activate its array sensor to a listening mode. The received signals at the array sensor obtained due to transmission of second probe signals 11a from the second active sensor 3 may then be used to determine DoA and localization of the first active sensor 2 with respect to the second active sensor 3. This information may then be signaled back to a lighting controller. The signaling may be done using different modalities, inter alia, infrared red, modulated light emitted by LEDs etc.

Typically the probe signals have a carrier frequency of approximately 30-50 kHz, preferably 25-45 kHz, even more preferably 40 kHz and a bandwidth of approximately 1-5 kHz, preferably 1-3 kHz, even more preferably 2 kHz. As an example, a commercial off-the-shelf transmitter with a carrier frequency of 40 kHz having a typical bandwidth of 2 kHz may be used.

The person skilled in the art realizes that the present invention by no means is limited to the preferred embodiments described above. On the contrary, many modifications and variations are possible within the scope of the appended claims.

The invention claimed is:

1. A control system, comprising:
    a light source;
    a first active sensor comprising a transmitter arranged to transmit a first probe signal, wherein the first active sensor is a portable sensor;
    a second active sensor comprising a transmitter arranged to transmit a second probe signal, wherein the second active sensor is a fixed sensor, and further comprising a receiver sensor array arranged to receive said first probe signal and an echo of said second probe signal; and
    a processing unit configured to predictively estimate a location of said first active sensor within the receiver sensor array based on said received first probe signal, and further configured to control a lighting function of said light source in accordance with said predictively estimated location of said first active sensor;
    wherein said first probe signal is different from said second probe signal such that interference at said receiving sensor array between said first probe signal and said second probe signal is avoided, the waveform of the first probe signal being chosen to be uncorrelated to the waveform of the second probe signal.

2. The control system according to claim 1, wherein said second active sensor is a fixed infrastructure sensor.

3. The control system according to claim 1, wherein said light source comprises said second active sensor.

4. The control system according to claim 1, wherein said receiving sensor array is arranged to perform direction of arrival measurements in order to estimate the location of said first active sensor.

5. The control system according to claim 4, wherein said sensor array is arranged to perform correlation in order to detect said first probe signal.

6. The control system according to claim 5, wherein said first active sensor and said second active sensor are either ultrasound based sensors or radar based sensors.

7. The control system according to claim 6, wherein said first active sensor is arranged to transmit at most one first probe signal for every three transmissions of said second probe signal.

8. The control system according to claim 7, wherein a version of said first probe signal is accessible by said second active sensor.

9. The control system according to claim 8, wherein said version of said first probe is an exact copy of said first probe signal.

10. The control system according to claim 9, wherein said first active sensor further comprises a receiver arranged to receive said second probe signal, and wherein said transmitter of said first active sensor is arranged to transmit said first probe signal in response to reception of said second probe signal by said receiver.

11. The control system according to claim 10, wherein said receiver of said first active sensor is an array sensor.

12. The control system according to claim 11, wherein said first probe signal is transmitted within the bandwidth of said transmitter of said second active sensor.

13. The control system according to claim 11, wherein said first probe signal is transmitted outside the bandwidth of said transmitter of said second active sensor.

14. A method in a control system comprising a light source, a first active sensor, and a second active sensor, the method comprising the steps of:
    transmitting, by a transmitter of said first active sensor, a first probe signal;
    transmitting, by a transmitter of said second active sensor, a second probe signal;
    receiving, by a receiver sensor array of said second active sensor, said first probe signal and an echo of said second probe signal;
    estimating, based on said received first probe signal, a location of said first active sensor within the receiver sensor array; and controlling a lighting function of said light source in accordance with said estimated location of said first active sensor;

wherein said first probe signal is different from said second probe signal such that interference at said receiving sensor array between said first probe signal and said second probe signal is avoided, the waveform of the first probe signal being chosen to be uncorrelated to the waveform of the second probe signal.

* * * * *